United States Patent
Orkiszewski (10) Patent No.: US 10,718,231 B2
(45) Date of Patent: Jul. 21, 2020

(54) METHOD AND SYSTEM FOR MITIGATING BOWED ROTOR OPERATION OF GAS TURBINE ENGINE

(71) Applicant: General Electric Company, Schenectady, NY (US)

(72) Inventor: Charles Stanley Orkiszewski, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 140 days.

(21) Appl. No.: 15/843,526

(22) Filed: Dec. 15, 2017

(65) Prior Publication Data

US 2019/0186284 A1 Jun. 20, 2019

(51) Int. Cl.

| | |
|---|---|
| *F01D 19/02* | (2006.01) |
| *F04D 29/66* | (2006.01) |
| *F01D 25/34* | (2006.01) |
| *F01D 5/02* | (2006.01) |
| *F04D 29/52* | (2006.01) |
| *F16D 43/30* | (2006.01) |
| *F16D 43/04* | (2006.01) |
| *F01D 19/00* | (2006.01) |
| *F02C 7/268* | (2006.01) |
| *F02C 7/26* | (2006.01) |
| *F02C 7/277* | (2006.01) |

(52) U.S. Cl.
CPC ............. *F01D 19/02* (2013.01); *F01D 25/34* (2013.01); *F04D 29/668* (2013.01); *F01D 5/02* (2013.01); *F01D 19/00* (2013.01); *F02C 7/26* (2013.01); *F02C 7/268* (2013.01); *F02C 7/277* (2013.01); *F04D 29/522* (2013.01); *F05D 2220/32* (2013.01); *F05D 2260/42* (2013.01); *F05D 2260/85* (2013.01); *F05D 2260/96* (2013.01); *F05D 2270/304* (2013.01); *F16D 43/04* (2013.01); *F16D 43/30* (2013.01)

(58) Field of Classification Search
CPC .......... F01D 19/00; F01D 19/02; F02C 7/275; F02C 7/277; F02C 7/27; F02C 7/26; F02C 7/268; F05D 2260/85; F05D 2260/4023
See application file for complete search history.

(56) References Cited

U.S. PATENT DOCUMENTS

| | | |
|---|---|---|
| 3,793,905 A | 2/1974 | Black et al. |
| 4,854,120 A | 8/1989 | Nelson et al. |

(Continued)

*Primary Examiner* — Ninh H. Nguyen
*Assistant Examiner* — Behnoush Haghighian
(74) *Attorney, Agent, or Firm* — Dority & Manning, P.A.

(57) ABSTRACT

Embodiments of systems and methods for operating a gas turbine engine defining a bowed rotor condition are generally provided. The systems and methods include rotating a rotor assembly defining a bowed rotor condition from approximately zero revolutions per minute (RPM) to within a bowed rotor mitigation speed range, in which the bowed rotor mitigation speed range is defined by a lower speed limit greater than zero RPM and an upper speed limit less than or equal to an idle speed condition of the gas turbine engine; applying a load at the rotor assembly via an energy storage device; adjusting the load to limit rotational speed or acceleration of the rotor assembly to within the bowed rotor mitigation speed range for a period of time; and removing the load to enable rotation of the rotor assembly to the idle speed condition following the period of time.

13 Claims, 5 Drawing Sheets

(56) References Cited

U.S. PATENT DOCUMENTS

| | | | |
|---|---|---|---|
| 5,172,543 A * | 12/1992 | White | F02C 7/275 |
| | | | 290/38 R |
| 8,510,013 B2 | 8/2013 | Jordan, Jr. et al. | |
| 8,820,046 B2 | 9/2014 | Ross et al. | |
| 9,472,026 B2 | 10/2016 | Gerez et al. | |
| 9,664,070 B1 * | 5/2017 | Clauson | F01D 25/36 |
| 10,125,636 B2 * | 11/2018 | Dube | F02C 3/04 |
| 10,378,442 B2 * | 8/2019 | Jackowski | F02C 7/32 |
| 10,443,507 B2 * | 10/2019 | Schwarz | F01D 25/36 |
| 2013/0031912 A1 * | 2/2013 | Finney | F01D 15/10 |
| | | | 60/778 |
| 2014/0318144 A1 | 10/2014 | Lazzeri et al. | |
| 2014/0366546 A1 * | 12/2014 | Bruno | F02C 9/00 |
| | | | 60/772 |
| 2014/0373552 A1 * | 12/2014 | Zaccaria | F02C 7/277 |
| | | | 60/778 |
| 2014/0373553 A1 * | 12/2014 | Zaccaria | F02C 7/277 |
| | | | 60/778 |
| 2017/0233103 A1 * | 8/2017 | Teicholz | B64D 27/16 |
| | | | 701/100 |
| 2017/0234158 A1 | 8/2017 | Savela | |
| 2017/0234167 A1 * | 8/2017 | Stachowiak | B64D 27/16 |
| | | | 416/1 |
| 2017/0234230 A1 | 8/2017 | Schwarz et al. | |
| 2017/0234233 A1 | 8/2017 | Schwarz et al. | |
| 2017/0234235 A1 * | 8/2017 | Pech | F02C 7/27 |
| | | | 290/31 |
| 2017/0234238 A1 * | 8/2017 | Schwarz | F02C 7/268 |
| | | | 60/778 |
| 2018/0355764 A1 * | 12/2018 | Clauson | F01D 21/20 |
| 2019/0128141 A1 * | 5/2019 | Pech | F02C 7/27 |

* cited by examiner

METHOD AND SYSTEM FOR MITIGATING BOWED ROTOR OPERATION OF GAS TURBINE ENGINE

FIELD

The present subject matter is directed generally to systems and methods for mitigating thermal bowing in gas turbine engines.

BACKGROUND

Gas turbine engines, such as those providing propulsion for aircraft, generate heat at the rotor assemblies during operation. Following shutdown of the engine, the rotor assembly is stationary (i.e., not rotating), which generally results in asymmetric heat distribution or thermal gradients circumferentially and/or axially along the rotor assembly. Such thermal gradients may generally result in thermal bowing or bowed rotor, such as along the radial, axial, and/or circumferential directions. Bowed rotor results in relatively large eccentricity relative to one or more casings surrounding the rotor assembly. As such, when a rotor assembly resumes operation, such eccentricity may generally cause the rotor assembly to operate with undesirable magnitudes of vibrations such as to damage surrounding casings, bearing assemblies, load structures, etc. Furthermore, such operation of the engine may result in airfoil blade tips rubbing into the surrounding casing, resulting in damage to the blades, the casings, or both.

Known methods to mitigate bowed rotor include allowing the rotor assembly to rest until the thermal gradient has naturally decreased over time such as to remove or eliminate the bowed rotor condition. However, in various instances, an engine may need to restart sooner than free convection heat transfer may allow. As such, there is a need for systems for reducing the thermal gradient of the rotor assembly such as to mitigate rotor bow in gas turbine engines.

BRIEF DESCRIPTION

Aspects and advantages of the invention will be set forth in part in the following description, or may be obvious from the description, or may be learned through practice of the invention.

One aspect of the present disclosure is directed to a method for operating a gas turbine engine defining a bowed rotor condition. The method includes rotating a rotor assembly defining a bowed rotor condition from approximately zero revolutions per minute (RPM) to within a bowed rotor mitigation speed range, in which the bowed rotor mitigation speed range is defined by a lower speed limit greater than zero RPM and an upper speed limit less than or equal to an idle speed condition of the gas turbine engine; applying a load at the rotor assembly via an energy storage device; adjusting the load to limit rotational speed or acceleration of the rotor assembly to within the bowed rotor mitigation speed range for a period of time; and removing the load to enable rotation of the rotor assembly to the idle speed condition following the period of time.

In various embodiments, applying a load at the rotor assembly further includes engaging the energy storage device via a clutch mechanism to couple the rotor assembly to the energy storage device when the rotor assembly rotates to the lower speed limit of the bowed rotor mitigation speed range. In one embodiment, engaging the energy storage device via a clutch mechanism further includes engaging a first centrifugal clutch of the clutch mechanism at or above the lower speed limit, in which the first centrifugal clutch couples the rotor assembly to a clutch shaft coupled to the first centrifugal clutch and a second centrifugal clutch of the clutch mechanism; and engaging a second centrifugal clutch at or below the upper speed limit, in which the second centrifugal clutch of the clutch mechanism couples the clutch shaft to the energy storage device.

In still various embodiments, removing the load to enable rotation of the rotor assembly to idle speed condition includes disengaging the energy storage device via a clutch mechanism to decouple the rotor assembly from the energy storage device when the rotor assembly rotates at or above the upper speed limit of the bowed rotor mitigation speed range. In one embodiment, disengaging the energy storage device via a clutch mechanism further includes disengaging a second centrifugal clutch of the clutch mechanism at or above the upper speed limit.

In one embodiment, the lower speed limit is between approximately 5% and approximately 50% of the idle speed condition. In another embodiment, the upper speed limit is between approximately 50% and approximately 95% of the idle speed condition.

In still another embodiment, rotating the rotor assembly to within a bowed rotor mitigation speed range includes increasing a rotational speed of the rotor assembly within the bowed rotor mitigation speed range approximately linearly during the period of time.

In one embodiment, the period of time at which the rotor assembly rotates within the bowed rotor mitigation speed range is based at least on a surface temperature of the rotor assembly, a temperature gradient across the rotor assembly, an air temperature proximate to the rotor assembly, an amount of time at zero RPM before rotating the rotor assembly, or a vibration measurement at the gas turbine engine. In another embodiment, the period of time at which the rotor assembly rotates within the bowed rotor mitigation speed range is predetermined as a function of at least one of a surface temperature of the rotor assembly, a temperature gradient across the rotor assembly, an air temperature proximate to the rotor assembly, or an amount of time at zero RPM before rotating the rotor assembly.

In still another embodiment, applying a load at the rotor assembly via an energy storage device includes generating electrical energy via the energy storage device defining an electric machine.

In still yet another embodiment, applying a load at the rotor assembly via an energy storage device includes generating at least one of pressure, flow, or temperature of a fluid via the energy storage device defining a fluid flow device.

In another embodiment, applying a load at the rotor assembly via an energy storage device includes increasing fluid resistance at a fluid flow device, in which the fluid flow device flows a fluid defining at least one of a fuel, a hydraulic fluid, air, inert gas, or a lubricant.

Another aspect of the present disclosure is directed to a gas turbine engine including a rotor assembly comprising a driveshaft extended along a longitudinal direction; and an energy storage device selectively coupled to the rotor assembly via a clutch mechanism. The clutch mechanism engages the energy storage device to couple the rotor assembly to the energy storage device when the rotor assembly rotates to a lower speed limit defined below an idle speed condition, and the clutch mechanism disengages the energy storage device to decouple the rotor assembly from the energy storage device when the rotor assembly rotates to an upper speed limit defined at or below the idle speed condition.

In various embodiments, the clutch mechanism further includes a first centrifugal clutch coupled to the rotor assembly; a second centrifugal clutch coupled to the energy storage device; and a clutch shaft selectively coupled to at least one of the first centrifugal clutch or the second centrifugal clutch. The first centrifugal clutch engages the clutch shaft at or above the lower speed limit, and the second centrifugal clutch is coupled to the clutch shaft at or below the upper speed limit, and further wherein the second centrifugal clutch disengages the clutch shaft above the upper speed limit. In one embodiment, the clutch mechanism further includes a first shaft coupled to the first centrifugal clutch and the driveshaft of the rotor assembly; and a second shaft coupled to the second centrifugal clutch and the energy storage device.

In one embodiment, the energy storage device defines at least in part an electric machine configured to receive mechanical energy via a load applied to the rotor assembly and clutch mechanism and convert the mechanical energy into electrical energy.

In another embodiment, the energy storage device defines at least in part a capacitor configured to receive, store, and discharge mechanical energy from a load applied to the rotor assembly.

In still another embodiment, the energy storage device defines a fluid flow device, wherein the fluid defines at least one of a fuel, a hydraulic fluid, air, inert gas, or a lubricant.

In still yet another embodiment, the lower speed limit is between approximately 5% and 50% of an idle speed condition, and wherein the upper speed limit is between approximately 50% and 95% of the idle speed condition.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention.

In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Embodiments of systems and methods for reducing a thermal gradient of a rotor assembly of a gas turbine engine are generally provided such as to mitigate or eliminate rotor bow. The embodiments of systems and methods generally provided herein may mitigate or eliminate damage or deterioration of the rotor assembly or surrounding casing due to eccentricity or non-concentricity of the rotor assembly relative to the casing due to thermal bowing of the rotor assembly. The embodiment generally provided herein may enable rotation or startup of the engine while in a bowed rotor condition and then to reduce or eliminate the bowed rotor condition during startup of the engine, such as to mitigate or eliminate damage to the rotor assembly or casing.

Figure 1:
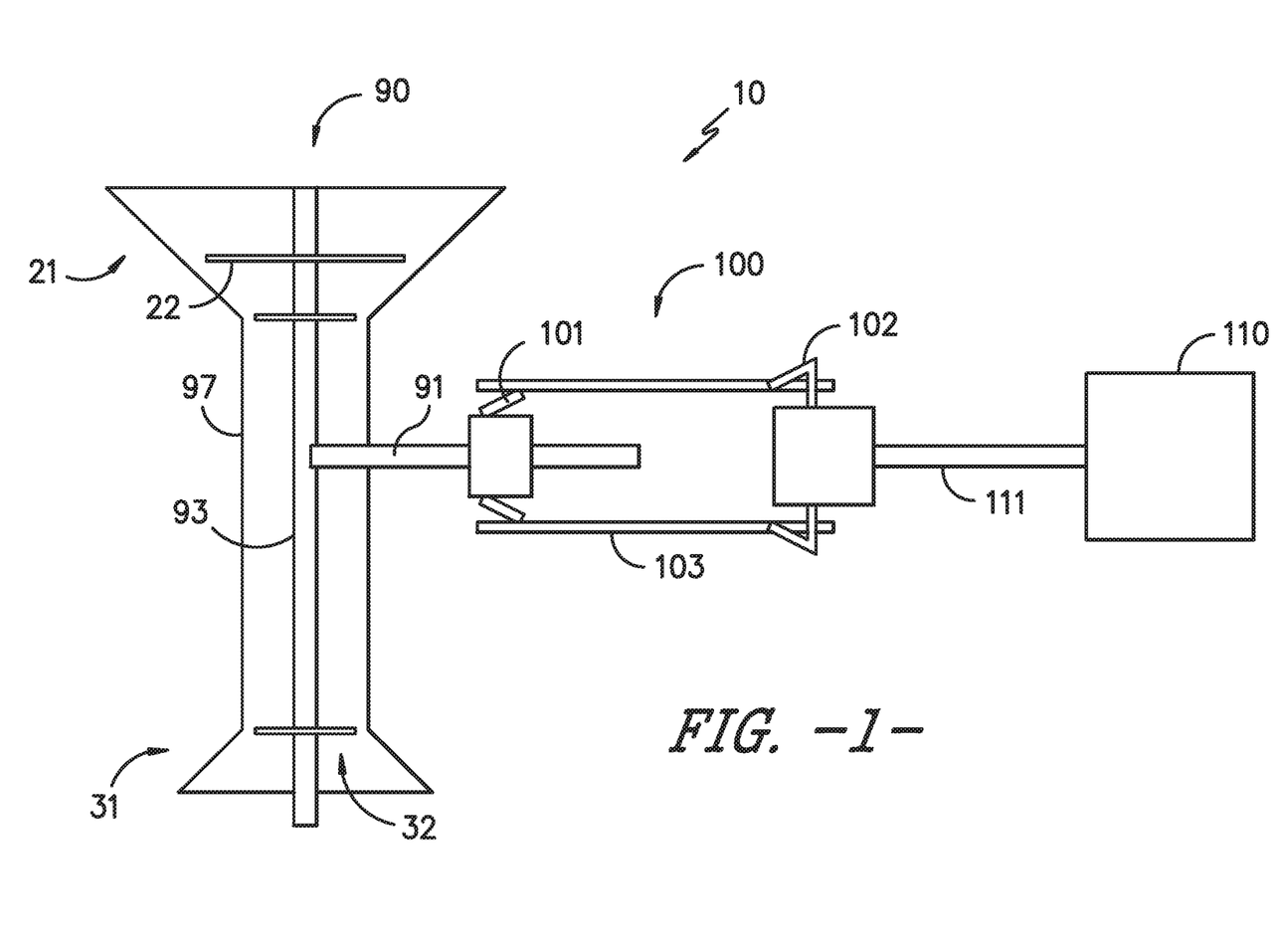
FIGS. 1-2 are schematic cross sectional views of a gas turbine engine incorporating systems and methods for mitigating bowed rotor operation according to an aspect of the present disclosure.
Figure 2:
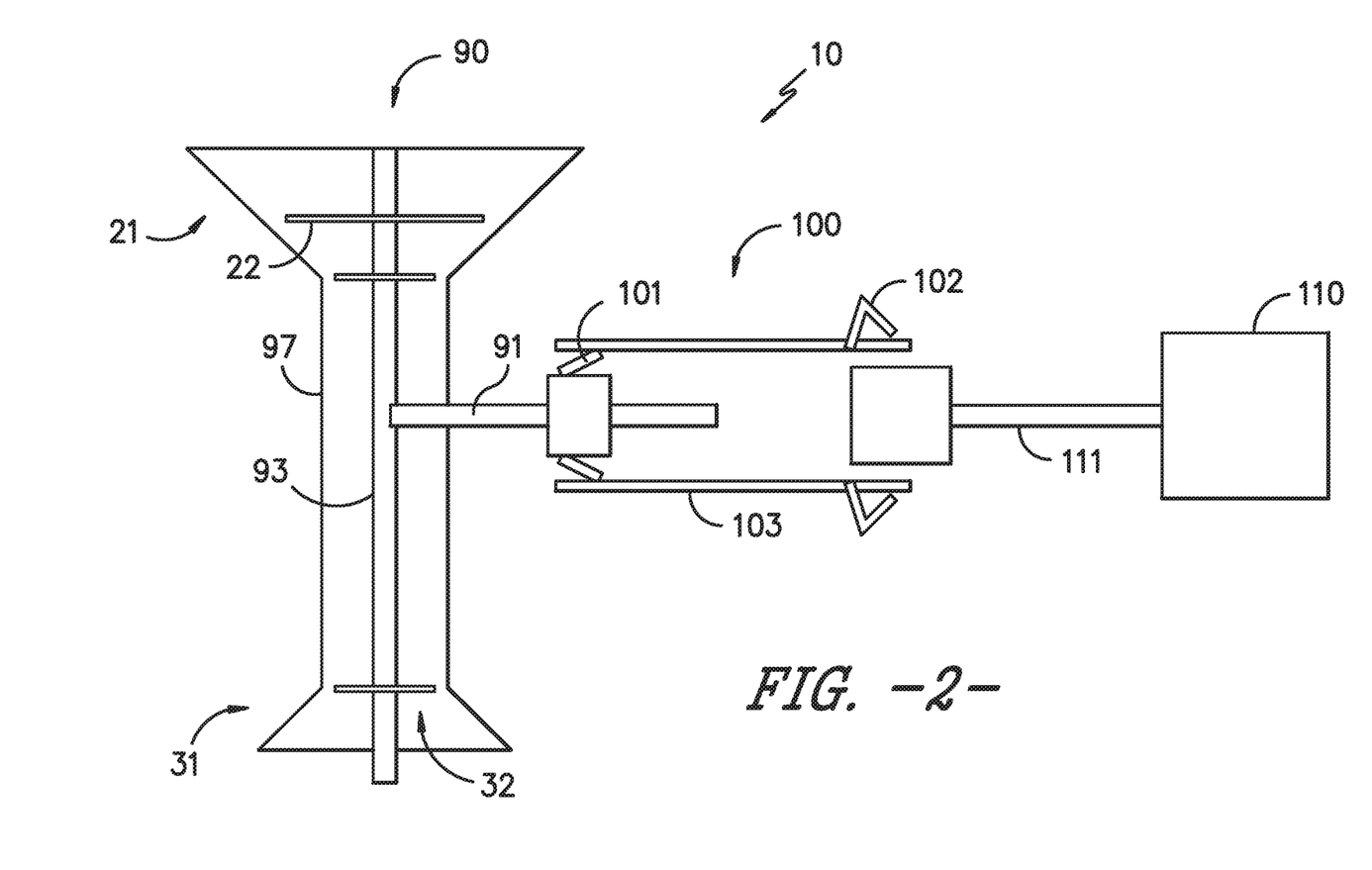

Referring now to the figures, FIGS. 1-2 are schematic views of exemplary embodiments of a gas turbine engine 10 according to an aspect of the present disclosure. The engine 10 includes a compressor section 21 and a turbine section 31 in serial flow arrangement. The engine 10 further includes a combustion section disposed between the compressor section 21 and the turbine section 31, in which the combustion section produces combustion products that expand at the turbine section 31 to generate thrust.

The engine 10 includes a rotor assembly 90 including a driveshaft 93 extended along a longitudinal direction, The rotor assembly 90 includes a rotor extended along a radial direction from the driveshaft 93, such as a compressor rotor 22 and a turbine rotor 32 each coupled to the driveshaft 93 as depicted schematically in FIGS. 1-2. The compressor rotor 22 may include a disk or drum extended radially from the driveshaft 93. The compressor rotor 22 further includes a plurality of airfoils, such as installed or affixed to the disk or drum, or manufactured integrally to the disk (e.g., a bladed disk or integrally bladed rotor).

In various embodiments, the compressor section 21 includes one or more compressors in serial flow arrangement to one another. For example, the compressor section 21 may define a high pressure (HP) compressor. In other embodiments, the compressor section 21 may further define an intermediate and/or low pressure compressor. Each compressor is defined generally mechanically independent of one another, such that rotation of one does not necessarily induce rotation of another, except insofar as the compressors are in aerodynamic dependency due to the serial flow of fluid therethrough. However, it should be appreciated that in other embodiments, one or more compressors may be in mechanical dependency, such as via a speed change device (e.g., gear assembly). Still further, it should be appreciated that the compressor section 21 may further include a propeller or fan assembly. For example, the engine 10 may define a turbofan, turboprop, turbojet, etc. configuration.

In still various embodiments, the turbine section 31 includes one or more turbines in serial flow arrangement to one another. For example, the turbine section 31 may define a HP turbine. In other embodiments, the turbine section 31 may further define an intermediate and/or low pressure turbine. Each turbine is coupled to each compressor, such as described above, via one or more shafts 93, such as to define each rotor assembly 90 as generally mechanically independent of one another, except insofar as the turbines are in aerodynamic dependency due to serial flow of fluid therethrough. Similarly, it should be appreciated that in other embodiments one or more turbines and rotor assemblies 90 may be in mechanical dependency, such as via a speed change device.

Referring still to FIGS. 1-2, the engine 10 further includes a casing 97 surrounding the rotor assembly 90. Various embodiments of the casing 97 further include shrouds and seals, such as abradable materials or other structures radially adjacent to the rotor assembly 90 such as to define a relatively closely formed primary flowpath across which air and combustion gases flow to generate thrust. In various embodiments, the casing 97 may further define a fan casing surrounding the rotor assembly 90 defining fan blades of a fan assembly. In still various embodiments, the casing 97 may further define a core engine casing surrounding the rotor assembly 90 defining one or more of a compressor rotor, a turbine rotor, or both.

The engine 10 further includes a clutch mechanism 100 selectively coupled to at least one of the rotor assembly 90 and an energy storage device 110. In one embodiment, the energy storage device 110 defines at least in part a capacitor configured to receive, store, and discharge mechanical energy from a load applied to the rotor assembly 90. For example, the capacitor may define an electric machine, a battery, or another electrical or electro-chemical energy storage device. In one embodiment, the energy storage device 110 defines at least in part an electric machine configured to receive mechanical energy via a load applied to the rotor assembly 90 and clutch mechanism 100 and convert the mechanical energy into electrical energy. In various embodiments, the clutch mechanism 100, the energy storage device 110, or both, are portions of an accessory gear assembly of the engine 10. In one embodiment, the energy storage device 110 may define one or more accessories of an accessory gear assembly, such as, but not limited to, a motor or generator, a fluid pump (e.g., fuel pump, oil pump, hydraulic pump, etc.), or a heat exchanger.

In another embodiment, the energy storage device 110 defines a fluid flow device. The fluid flow device may define a lubricant system, such as, but not limited to, an oil pump, a fuel pump, a hydraulic pump, a heat exchanger, or a fluid scavenge device. The fluid may define at least one of a fuel, a hydraulic fluid, air, inert gas, or a lubricant. The fluid flow device may increase or decrease a load applied to the rotor assembly 90, such as via closing or opening valves, orifices, or otherwise increasing or decreasing a resistance of to the flow of fluid to or through the engine 10 such as to require an increased energy input from the rotor assembly 90 to flow the fluid.

Figure 3:
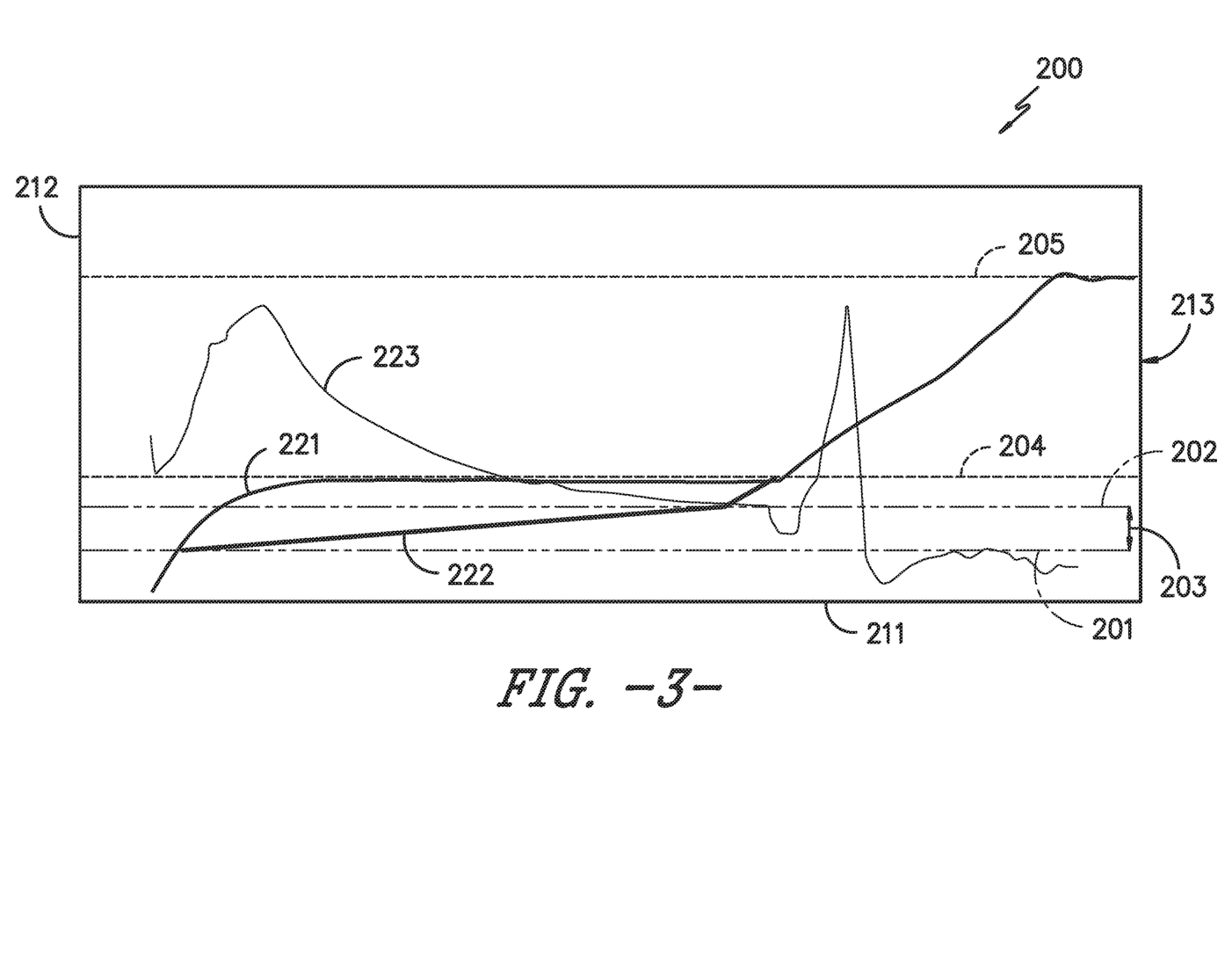
FIG. 3 is an exemplary chart depicting rotor speed versus time and rotor vibratory response versus time according to an aspect of the present disclosure.

Referring briefly to FIG. 3, an exemplary embodiment of a chart 200 depicting rotor speed versus time and rotor/casing clearance versus time is generally provided. The chart 200 defines a time axis 211, a rotor/casing clearance axis 212, and a rotational speed axis 213 of the rotor assembly 90 (FIGS. 1-2). The chart 200 further depicts a lower speed limit 201 and an upper speed limit 202 together defining a bowed rotor mitigation speed range 203. The bowed rotor mitigation speed range 203 is defined generally below an idle speed 205 of the engine 10. For example, the idle speed of the engine 10 (FIGS. 1-2) may define a minimum steady state speed of the engine 10 based on a minimum flow of fuel and combustion products produced therefrom. In various embodiments, the bowed rotor mitigation speed range is defined between approximately 5% and approximately 95% of the idle speed 205 of the engine 10. In one embodiment, the lower speed limit 201 is between approximately 5% and 50% of the idle speed condition 205. In another embodiment, the upper speed limit 202 is between approximately 50% and 95% of the idle speed condition 205. In still various embodiments, the bowed rotor mitigation speed range 203 may be defined below a combustion speed 204 of the engine 10, in which the combustion speed 204 is a rotational speed of the rotor assembly 90 approximately at which a flow of fuel is provided to a flow of oxidizer and ignited to yield combustion products. The flow of combustion products may then enable operation of the rotor assembly 90 at or above the idle speed condition 205.

Referring now to FIGS. 1-3, the clutch mechanism 100 engages the energy storage device 110 to couple the rotor assembly 90 to the energy storage device 110 when the rotor assembly 90 rotates at or below the lower speed limit 201 defined below the idle speed condition 205. The clutch mechanism 100 disengages the energy storage device 110 to decouple the rotor assembly 90 from the energy storage device 110 when the rotor assembly 90 rotates at or above the upper speed limit 202 defined at or below the idle speed condition 205.

Referring still to FIG. 3, in conjunction with FIGS. 1-2, line 221 exemplifies a first speed/time curve generally depicting a change in speed of the rotor assembly 90 from startup (e.g., from generally zero RPM) to the combustion speed 204 without the clutch mechanism 100 engaging the energy storage device 110. Line 222 exemplifies a second speed/time curve generally depicting a change in speed of the rotor assembly 90 from startup to the combustion speed 204 with the clutch mechanism 100 engaging the energy storage device 110, such as further described herein. Line 223 exemplifies a rotor/casing clearance curve generally depicting a change in clearance between the rotor assembly 90 and the casing 97 over time.

As generally described in regard to FIGS. 1-5, the engine 10 and method 1000 generally provide for a gradual change in rotational speed of the rotor assembly 90 within the bowed rotor mitigation speed range 203, such as generally depicted in chart 200 at line 222. Still further, the chart 200 exemplifies a gradual increase in rotational speed of the rotor assembly 90 at line 222 approximately proportional to a gradual decrease in rotor/casing clearance at line 223 that may mitigate rotor/casing rubs, rotor eccentricity, or other deterioration or damage to the engine 10.

In contrast, line 221 exemplifies a substantially flat or unchanging rotational speed of the rotor assembly 90 outside of the bowed rotor mitigation speed range 203 (e.g., greater than the bowed rotor mitigation speed range 203) relative to a generally decreasing rotor/casing clearance at line 223. The greater rotational speed of the rotor assembly 90 may further define greater vibrations that damage or deteriorate engine performance and operation, such as via rotor rubs into the casing, eccentricity or non-concentricity of the rotor assembly relative to the casing, or damage to bearing assemblies coupled to the rotor assembly.

Referring to FIGS. 1-2, in various embodiments, the clutch mechanism 100 further includes a first centrifugal clutch 101 coupled to the rotor assembly 90 and a second centrifugal clutch 102 coupled to the energy storage device 110. The clutch mechanism 100 may further include a clutch shaft 103 selectively coupled to at least one of the first centrifugal clutch 101 or the second centrifugal clutch 102. Referring now to FIGS. 1-3, the first centrifugal clutch 101 engages the clutch shaft 103 at or above the lower speed limit 201. The second centrifugal clutch 102 is coupled to the clutch shaft 103 at or below the upper speed limit 202. The second centrifugal clutch 102 disengages the clutch shaft 103 at or above the upper speed limit 202.

Referring still to FIGS. 1-3, in various embodiments, the clutch mechanism 100 further includes a first shaft 91 coupled to the first centrifugal clutch 101 and the driveshaft 93 of the rotor assembly 90. The clutch mechanism 100 further includes a second shaft 111 coupled to the second centrifugal clutch 102 and the energy storage device 110. In various embodiments, the first shaft 91 may define a radial shaft or towershaft including one or more gear assemblies (not shown) coupled to the rotor assembly 90 to enable transfer of energy to and from the rotor assembly 90 and the energy storage device 110 via the clutch mechanism 100.

Figure 4:
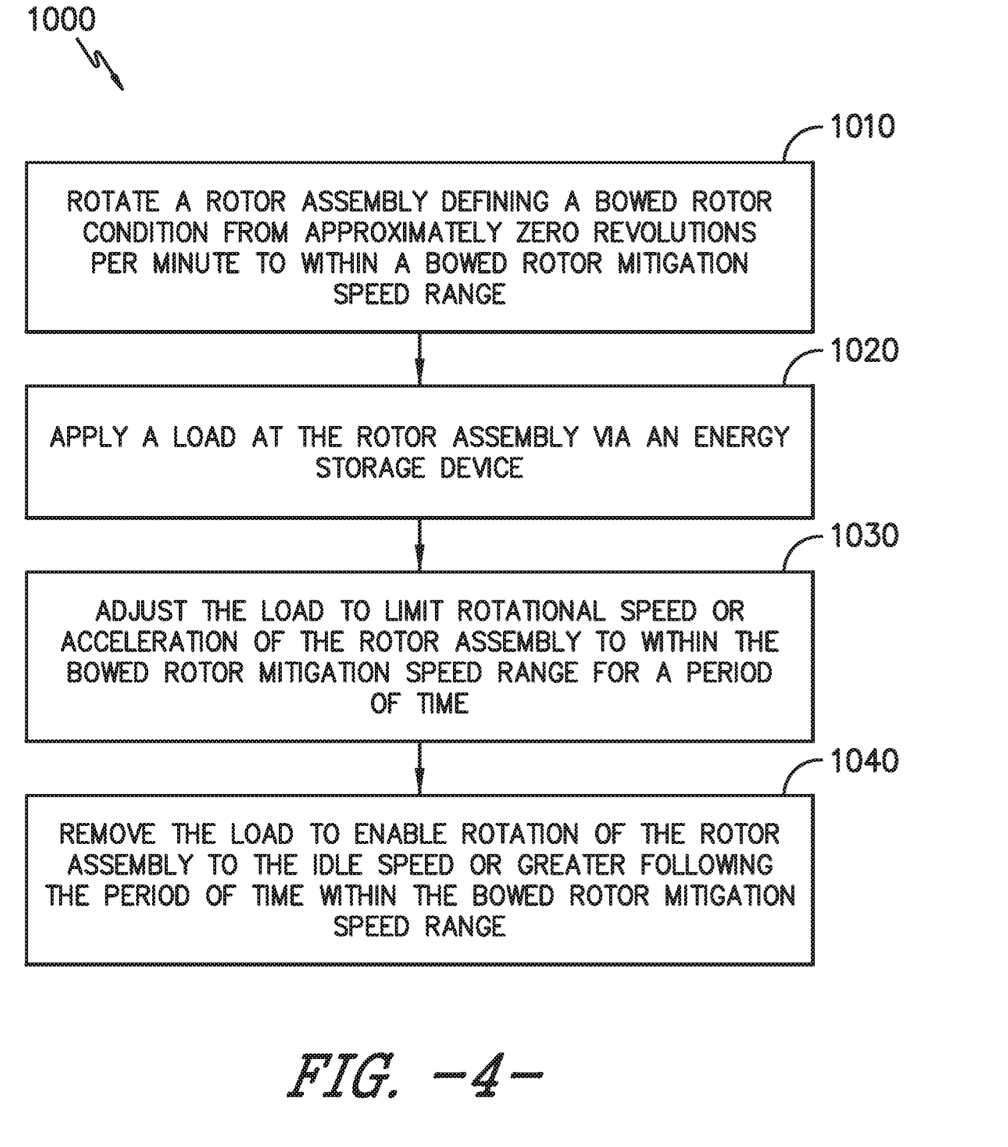
FIGS. 4-5 depict a flowchart outlining exemplary steps of a method for mitigating bowed rotor operation of a gas turbine engine.
Figure 5:
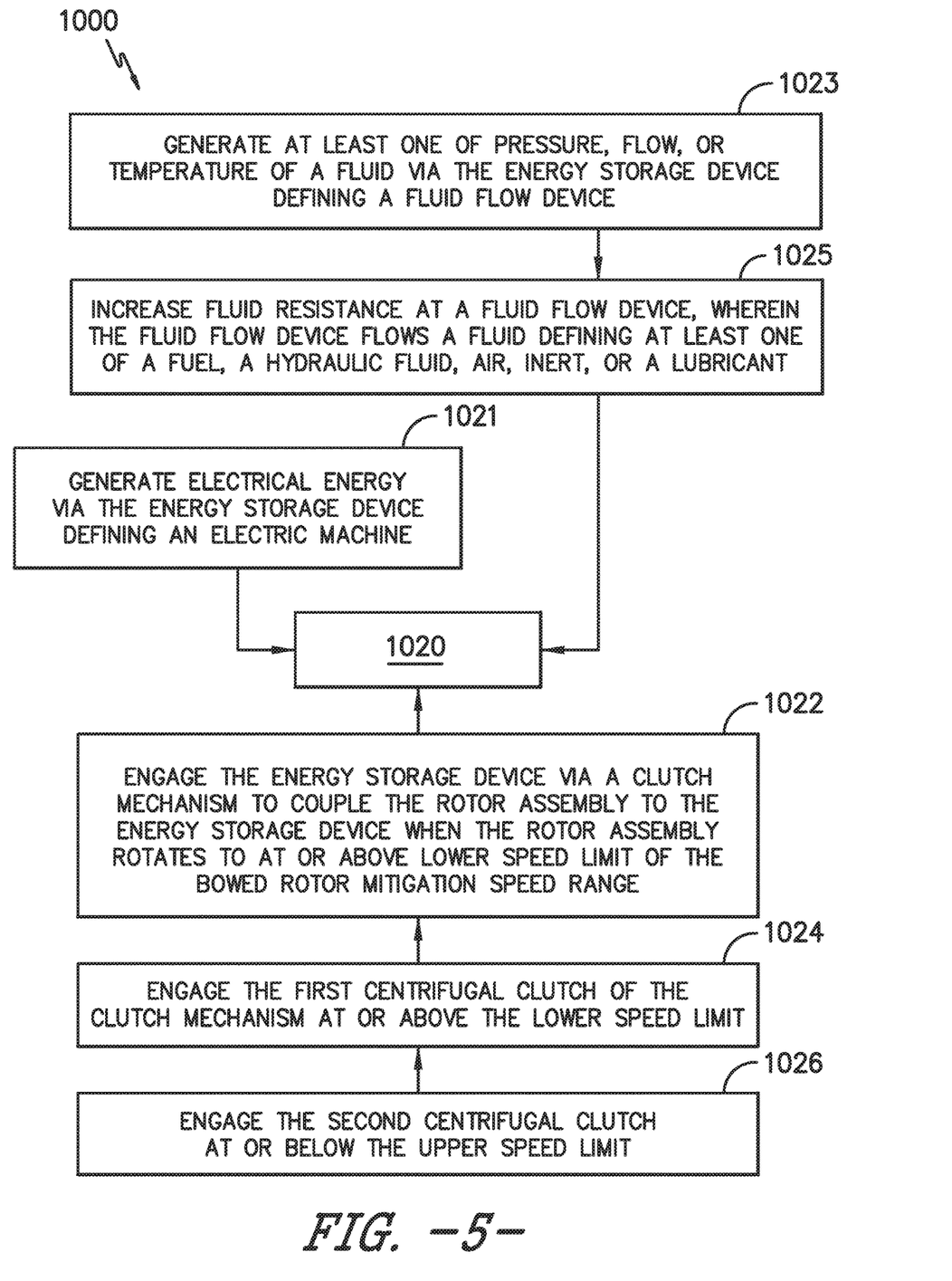

Referring now to FIGS. 4-5, an exemplary flowchart outlining steps of a method for mitigating bowed rotor operation of a gas turbine engine (hereinafter, "method 1000") is generally provided. Embodiments of the method 1000 may generally be utilized or implemented with embodiments of the engine 10 generally provided in FIGS. 1-3. However, it should be appreciated that the method 1000 may be utilized or implemented with other embodiments of a gas turbine engine, such as, but not limited to, turbofan, turboprop, and turboshaft gas turbine engines, including single spool, two spool, three spool, or more, gas turbine engines. Furthermore, the method 1000 includes steps presented in a sequence. However, it should be appreciated that steps of the method 1000 may be re-arranged, re-ordered, re-sequenced, altered, omitted, or added to without removing from the scope of the present disclosure.

The method 1000 may generally be implemented with a rotor assembly (e.g., rotor assembly 90) defining a thermal bowing or bowed rotor condition. For example, the bowed rotor condition may generally define a distortion or bowing along a length of the driveshaft 93 such as to define an eccentricity or non-concentricity of the rotors (e.g., compressor rotor 22, turbine rotor 32, etc.) relative to the surrounding casing 97. Generally, when a gas turbine engine rotates a rotor assembly defining a bowed rotor condition, one or more rotors may rub or otherwise impact an inner diameter of the casing such as to damage one or more of the rotors and the casing, thereby resulting in deteriorated engine condition and operation.

Referring to the method 1000 outlined in FIGS. 4-5 and embodiments of the engine 10 generally provided in FIGS. 1-3, the method 1000 may include at 1010 rotating a rotor assembly (e.g., rotor assembly 90, FIGS. 1-2) defining a bowed rotor condition from approximately zero revolutions per minute (RPM) to within a bowed rotor mitigation speed range (e.g., bowed rotor mitigation speed range 203, FIG. 3). As described in regard to FIG. 3, the bowed rotor mitigation speed range 203 is defined by a lower speed limit 201 greater than zero RPM and an upper speed limit 202 less than or equal to an idle speed condition 205 of the gas turbine engine.

At 1020, the method 1000 further includes applying a load at the rotor assembly via an energy storage device (e.g., energy storage device 110). As described in regard to FIGS. 1-2, the energy storage device 110 may apply a load at the rotor assembly 90 via a capacitor, an electric machine, a fluid flow device, or combinations thereof. Various embodiments of the method 1000 at 1020 may include steps based on one or more embodiments of the energy storage device 110, such as described in regard to FIGS. 1-2. In one embodiment, the method 1000 at 1020 may further include at 1021 generating electrical energy via the energy storage device defining an electric machine. In another embodiment, the method 1000 at 1020 may further include at 1023 generating at least one of pressure, flow, or temperature of a fluid via the energy storage device defining a fluid flow device. In one embodiment at 1023, the method 1000 may further include at 1025 increasing fluid resistance at a fluid flow device, wherein the fluid flow device flows a fluid defining at least one of a fuel, a hydraulic fluid, air, inert gas, or a lubricant.

Referring still to FIGS. 1-5, in various embodiments, the method 1000 at 1020 may further include at 1022 engaging the energy storage device 110 via a clutch mechanism 100 to couple the rotor assembly 90 to the energy storage device 110 when the rotor assembly 90 rotates to at or above lower speed limit 201 of the bowed rotor mitigation speed range 203. For example, engaging the first centrifugal clutch 201 may include rotating or accelerating the rotor assembly 90 to a speed, such as the lowed speed limit 201, via a starter motor of the engine 10. In one embodiment, engaging the energy storage device 110 via the clutch mechanism 100 further includes at 1024 engaging the first centrifugal clutch 101 of the clutch mechanism 100 at or above the lower speed limit 201, such as generally provided in FIG. 1. The first centrifugal clutch 101 couples the rotor assembly 90 to the clutch shaft 103 coupled to the first centrifugal clutch 101 and the second centrifugal clutch 102 of the clutch mechanism 100. The method 1000 at 1022 may further at 1026 engaging the second centrifugal clutch 102 at or below the upper speed limit 202, such as generally provided in FIG. 1. The second centrifugal clutch 201 of the clutch mechanism 100 couples the clutch shaft 103 to the energy storage device 110. In one embodiment, increasing a rotational speed of the rotor assembly 90 within the bowed rotor mitigation speed range approximately linearly during the period of time.

At 1030, the method 1000 further includes adjusting the load to limit rotational speed or acceleration of the rotor assembly to within the bowed rotor mitigation speed range for a period of time. Referring to FIG. 3, the period of time within which the rotor assembly 90 (FIGS. 1-2) rotates at one or more speeds within the bowed rotor mitigation speed range 203 is defined from when the rotor assembly 90 rotates at or above the lower speed limit 201 and at or under the upper speed limit 202. In one embodiment, the rotor assembly 90 may rotate within the bowed rotor mitigation speed range 203 at approximately zero acceleration. In another embodiment, the rotor assembly 90 may accelerate within the bowed rotor mitigation speed range 203 such as to define a rate of acceleration within a desired period of time within the bowed rotor mitigation speed range 203 (i.e., a rate of acceleration of the rotor assembly 90 for a period of time from approximately the lower speed limit 201 to approximately the upper speed limit 202, or a range therewithin).

Referring still to FIGS. 1-5, in various embodiments, the period of time at which the rotor assembly 90 rotates within the bowed rotor mitigation speed range 203 is based at least on a surface temperature of the rotor assembly 90 (e.g., a surface temperature of one or more of the driveshaft 93, the compressor rotor 22, the turbine rotor 32, etc.), a temperature gradient across the rotor assembly 90 (e.g., a surface temperature of one or more of the driveshaft 93, the compressor rotor 22, the turbine rotor 32, etc.), an air temperature proximate to the rotor assembly 90 (e.g., within the casing 97, or between the casing 97 and the rotor assembly 90), an amount of time at zero RPM before rotating the rotor assembly 90 (e.g., an amount of time following shutdown of the engine 10), or a vibration measurement at the engine 10. In another embodiment, the period of time at which the rotor assembly 90 rotates within the bowed rotor mitigation speed range 203 is predetermined as a function of at least one of a surface temperature of the rotor assembly 90, a temperature gradient across the rotor assembly 90, an air temperature proximate to the rotor assembly 90, or an amount of time at zero RPM before rotating the rotor assembly 90.

At 1040, the method 1000 further includes removing the load to enable rotation of the rotor assembly 90 to the idle speed 205 or greater following the period of time within the bowed rotor mitigation speed range 203. Following further acceleration of the rotor assembly 90 greater than the upper speed limit 202 of the bowed rotor mitigation speed range 203, a flow of fuel may be provided and mixed with a flow of oxidizer (e.g., at or greater than the combustion speed 204) and ignited to yield combustion products to drive rotation of the rotor assembly 90 to the idle speed 205 or greater.

In still various embodiments, the method 1000 at 1040 may further include at 1042 disengaging the energy storage device 110 via the clutch mechanism 100 to decouple the rotor assembly 90 from the energy storage device 110. For example, when the rotor assembly 90 rotates at or above the upper speed limit 202 of the bowed rotor mitigation speed range 203, the clutch mechanism 100 disengages from the energy storage device 100, such as generally provided in regard to FIGS. 2-3. In one embodiment, the method at 1042 further includes at 1046 disengaging the second centrifugal clutch 102 of the clutch mechanism 100 at or above the upper speed limit 203.

Embodiments of engine 10 and methods 1000 generally provided herein may reduce a thermal gradient of the rotor assembly 90 of the engine 10 such as to mitigate or eliminate rotor bow. The embodiments of engine 10 and methods 1000 generally provided herein may mitigate or eliminate damage or deterioration of the rotor assembly 90 or surrounding casing 93 due to eccentricity or non-concentricity of the rotor assembly 90 relative to the casing 93 due to thermal bowing of the rotor assembly 90. The embodiment generally provided herein may enable rotation or startup of the engine 10 while in a bowed rotor condition and then to reduce or eliminate the bowed rotor condition during startup of the engine 10, such as to mitigate or eliminate damage to the rotor assembly 90 or casing 93.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of operating a gas turbine engine with bowed rotor, the method comprising:
   rotating a rotor assembly defining a bowed rotor condition from approximately zero revolutions per minute (RPM) to within a bowed rotor mitigation speed range, wherein the bowed rotor mitigation speed range is defined by a lower speed limit greater than zero RPM and an upper speed limit less than or equal to an idle speed condition of the gas turbine engine;
   applying a load at the rotor assembly via an energy storage device;
   adjusting the load to limit rotational speed or acceleration of the rotor assembly to within the bowed rotor mitigation speed range for a period of time; and
   removing the load to enable rotation of the rotor assembly to the idle speed condition following the period of time.

2. The method of claim 1, wherein applying the load at the rotor assembly further comprises:
   engaging the energy storage device via a clutch mechanism to couple the rotor assembly to the energy storage device when the rotor assembly rotates to the lower speed limit of the bowed rotor mitigation speed range.

3. The method of claim 1,
   wherein applying the load at the rotor assembly further comprises engaging the energy storage device via a clutch mechanism to couple the rotor assembly to the energy storage device, which comprises:
   engaging a first centrifugal clutch of the clutch mechanism at or above the lower speed limit, wherein the first centrifugal clutch couples the rotor assembly to a clutch shaft coupled to the first centrifugal clutch and a second centrifugal clutch of the clutch mechanism; and
   engaging the second centrifugal clutch at or below the upper speed limit, wherein the second centrifugal clutch of the clutch mechanism couples the clutch shaft to the energy storage device.

4. The method of claim 1, wherein removing the load to enable rotation of the rotor assembly to idle speed condition comprises:
   disengaging the energy storage device via a clutch mechanism to decouple the rotor assembly from the energy storage device when the rotor assembly rotates at or above the upper speed limit of the bowed rotor mitigation speed range.

5. The method of claim 4, wherein disengaging the energy storage device via a clutch mechanism further comprises:
   disengaging a second centrifugal clutch of the clutch mechanism at or above the upper speed limit.

6. The method of claim 1, wherein the lower speed limit is between approximately 5% and approximately 50% of the idle speed condition.

7. The method of claim 1, wherein the upper speed limit is between approximately 50% and approximately 95% of the idle speed condition.

8. The method of claim 1, wherein the rotating the rotor assembly to within the bowed rotor mitigation speed range comprises:
   increasing a rotational speed of the rotor assembly within the bowed rotor mitigation speed range approximately linearly during the period of time.

9. The method of claim 1, wherein the period of time at which the rotor assembly rotates within the bowed rotor mitigation speed range is based at least on a surface temperature of the rotor assembly, a temperature gradient across the rotor assembly, an air temperature proximate to the rotor assembly, an amount of time at zero RPM before rotating the rotor assembly, or a vibration measurement at the gas turbine engine.

10. The method of claim 1, wherein the period of time at which the rotor assembly rotates within the bowed rotor mitigation speed range is predetermined as a function of at least one of a surface temperature of the rotor assembly, a temperature gradient across the rotor assembly, an air temperature proximate to the rotor assembly, or an amount of time at zero RPM before rotating the rotor assembly.

11. The method of claim 1, wherein applying the load at the rotor assembly via an energy storage device comprises:
   generating electrical energy via the energy storage device defining an electric machine.

12. The method of claim 1, wherein applying the load at the rotor assembly via an energy storage device comprises:
   generating at least one of pressure, flow, or temperature of a fluid via the energy storage device defining a fluid flow device.

13. The method of claim 1, wherein applying the load at the rotor assembly via an energy storage device comprises:
   increasing fluid resistance at a fluid flow device, wherein the fluid flow device flows a fluid defining at least one of a fuel, a hydraulic fluid, air, inert gas, or a lubricant.

* * * * *